(12) United States Patent
Larson et al.

(10) Patent No.: US 6,877,039 B2
(45) Date of Patent: Apr. 5, 2005

(54) SIMPLIFIED PIPELINE WRITES OVER A NETWORK

(75) Inventors: Jeffrey D. Larson, San Jose, CA (US); Takashi Miyoshi, San Jose, CA (US); Takeshi Horie, Palo Alto, CA (US); Hirohide Sugahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 878 days.

(21) Appl. No.: 09/842,481

(22) Filed: Apr. 25, 2001

(65) Prior Publication Data

US 2002/0161842 A1 Oct. 31, 2002

(51) Int. Cl.[7] ........................ G06F 15/16; G06F 13/36; G08C 25/02
(52) U.S. Cl. ...................... 709/237; 709/227; 714/748; 710/306
(58) Field of Search ............................... 709/206, 207, 709/227, 230, 236, 237, 245; 714/748, 749; 710/100, 104–125, 300–317

(56) References Cited

U.S. PATENT DOCUMENTS

| | | | | |
|---|---|---|---|---|
| 5,432,798 A | * | 7/1995 | Blair | 714/748 |
| 5,754,754 A | * | 5/1998 | Dudley et al. | 714/18 |
| 6,163,861 A | * | 12/2000 | Yoshioka et al. | 714/748 |
| 6,233,636 B1 | | 5/2001 | Kelley et al. | |
| 6,742,044 B1 | * | 5/2004 | Aviani et al. | 709/227 |

OTHER PUBLICATIONS

Intel Corporation, "Getting Started with the 21554 Embedded PCI–to–PCI Bridge," Application Note, 14 pages, Order Number 278210–001, Sep. 1998.

* cited by examiner

Primary Examiner—Hosain Alam
Assistant Examiner—David Lazaro
(74) Attorney, Agent, or Firm—Fenwick & West LLP

(57) ABSTRACT

A system and method are provided for efficiently writing data from one bus device to another bus device across a network. Data packets to be transmitted are ordered and assigned sequence numbers and expected sequence numbers. The expected sequence number of a data packet corresponds to the sequence number of the data packet immediately prior to the current data packet. When a data packet arrives at the receiving bus, its expected sequence number is compared against the sequence numbers of the previous data packets received. If the previously-received data packet bears the sequence number corresponding to the expected sequence number of the newly arrived data packet, the newly arrived data is stored, and an acknowledgement is sent. If a match cannot be found then a retry request message is sent.

11 Claims, 7 Drawing Sheets

1

SIMPLIFIED PIPELINE WRITES OVER A NETWORK

BACKGROUND OF THE INVENTION

1. Field of Invention

The present invention deals with communication of instructions between input/output devices on a bus and memory.

2. Description of the Related Art

Devices attached to a computer system, e.g. disk drives, sound cards, modems, etc. are connected to the processor of the computer through a system bus. One type of bus is the Peripheral Component Interconnect (PCI) bus. Other types of buses include Industry Standard Architecture (ISA) and VESA Local Bus.

In a network environment, multiple computer systems are connected to each other via a network such as a LAN or WAN. Peripherals on one system frequently send data to remote memory located on another computer attached to the network. Typically, this data is spread across multiple data packets. These packets are transmitted in post-write format, i.e. in sequence without waiting for confirmation from the remote computer that the previous packets were received. For example, if data is spread across three packets, then the second and third packets are typically sent before any acknowledgement is received for the first packet. Sending multiple packets at the same time is designed to reduce delays caused by latency in the network and remote computer systems.

In order for the data to be effectively used by the receiving computer system, however, the ordering must be maintained across the data packets. Thus, if packets are received out of order, or if a packet is lost in transit, the whole stream is unusable. The easiest conventional solution to this problem is to not send a subsequent packet until receipt of the initial packet has been acknowledged. This solution is too expensive to be of practical use, however, because of the latency required for implementation.

Another conventional solution to the problem is to send the packets at once, and resend only those not received by the receiving computer. To do this, the packets contain sequence numbers. If the receiving computer does not receive one of the packets in the sequence, it sends a message, called a "retry request" or "nack," to the sending computer, which can then resend the lost packet. The drawback to this solution is that the receiving computer must maintain a count of every packet in a sequence that has been received, and try to determine if any packets have been lost. When many computers are transmitting data packets to the same receiving computer at once, the receiving computer has to maintain this list for each sending computer. The consequence is that the sequence table in the receiving computer must either be very large, or else risk losing data. Neither is a preferable outcome, and thus the solution is not satisfactory.

Another conventional solution is to assign a number of "credits" to the transmitting computer system. The requester sends packets until the data size reaches the credit count. The receiver returns credits incrementally when buffer space becomes available for succeeding packets. The difficulty with this solution is once again the high cost of latency, here present in the set-up required to allocate credits. For example, if the data size is 4 kilobytes, latency becomes about 1–2 microseconds each time there is an input/output write.

Accordingly, what is needed is an efficient way of transmitting data from one bus to another across a network that does not suffer from long latency costs or have to repeatedly send data packets unnecessarily.

SUMMARY OF INVENTION

The present invention provides a system and method for efficiently writing data from one bus device to another bus device across a network. The present invention is applicable to bus types that support "posted writes" or "delayed writes," such as a PCI bus. Data packets to be transmitted are ordered and assigned sequence numbers and expected sequence numbers. The expected sequence number of a data packet corresponds to the sequence number of the data packet immediately prior to the current data packet. When a data packet arrives at the receiving bus, its expected sequence number is compared against the sequence number of the data packet received just prior. If a data packet has already been received bearing the sequence number corresponding to the expected sequence number of the newly arrived data packet, the newly arrived data is stored, and an acknowledgement is sent. If a match cannot be found then a retry request message is sent.

BRIEF DESCRIPTION OF DRAWINGS

These and other more detailed and specific objects and features of the present invention are more fully disclosed in the following specification, reference being had to the accompanying drawings, in which.

DETAILED DESCRIPTION

Figure 1:
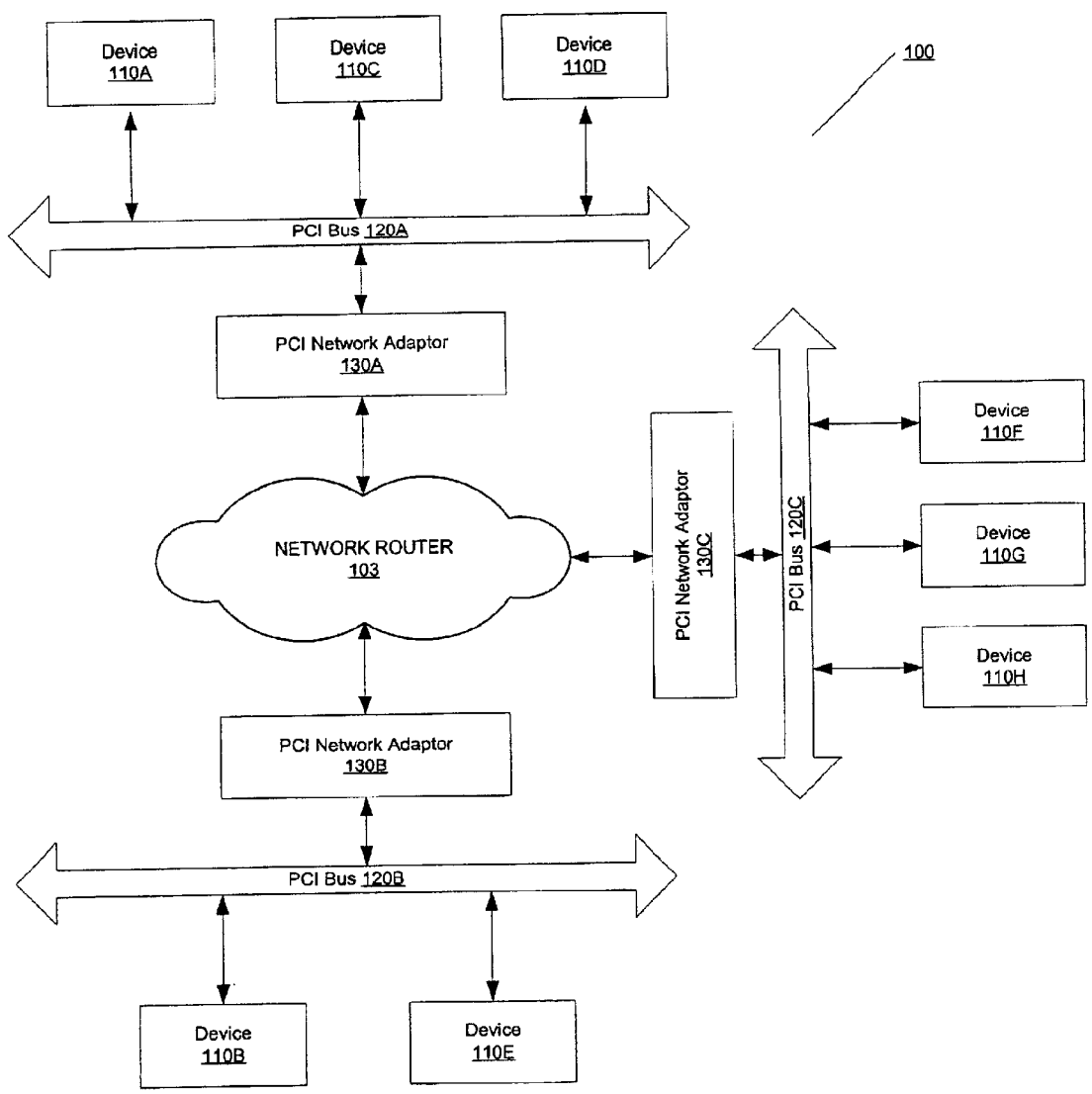
FIG. 1 is a block diagram of a system in accordance with a preferred embodiment of the present invention.

FIG. 1 is a block diagram of a preferred embodiment of a system 100 in accordance with the present invention. In the illustrated embodiment, system 100 includes a network router 103, PCI network adaptors 130A–C, PCI buses 120A–C, and devices 110A–H. Note that while the illustrated embodiment includes a PCI-type bus, in other embodiments system 100 includes other bus types that support posted write or delayed write protocols, e.g. an AGP bus. Thus, the description provided here is not meant to imply that the scope of the present invention is limited to PCI architecture, although merely for clarity of description, it is a PCI architecture embodiment that is described.

Each device 110 is coupled to a conventional bus such as PCI bus 120. For example, in the illustrated embodiment, devices A, C and D are connected to PCI bus 120A, devices B and E are connected to PCI bus 120B, and devices F, G and H are connected to PCI bus 120C. Although two or three devices 100 are shown on each bus, one skilled in the art will recognize that either fewer or more devices 100 can be connected to any one bus depending on the desired application and system performance. Each bus 120 is coupled to a network adaptor 130 that provides an interface for implementing conventional protocols and ordering rules. The PCI network adapters 130A through 130C are further coupled to a network router 103. Again, although FIG. 1 depicts three PCI network adapters 130, other embodiments comprise different numbers of adapters and different bus architecture types as necessary for a particular application.

Each of devices 110A through 110H may be a conventional device such as a display, disk drive, sound card or SCSI adapter. Device 110 can also represent a conventional workstation or personal computer on a network, or it can represent an entire network. Alternatively, device 110 can represent a specialized node. For example, device 110 can be a data vault comprising a Direct Memory Access (DMA) device or disk controller card coupled to one or more storage devices. Device 110 can represent either an unintelligent node, such as an I/O device or an intelligent node that has a resident central processing unit (CPU) or microcontroller unit. In short, device 110 can be any one of a number of devices or node configurations.

The bus is a common expansion bus as used in the computer industry for connecting a processor with memory and/or peripheral devices. The network adaptor 130 receives and processes remote read and write requests. The PCI network adaptor 130 is described in further detail below. The network router 103 may be any type of conventional router as used for data transfer over the Internet, an intranet, a local area network or any other networked environment. The various devices send remote read and/or write requests via bus 120 to the network adaptor 130. The network adaptor 130 processes the requests as discussed below. The requests are then sent via network router 103 to their respective destination addresses. The processing of the requests ensures that the network adaptor 130 at the receiving side will recognize that a request has been lost along the way, or received out of order.

Figure 2A:
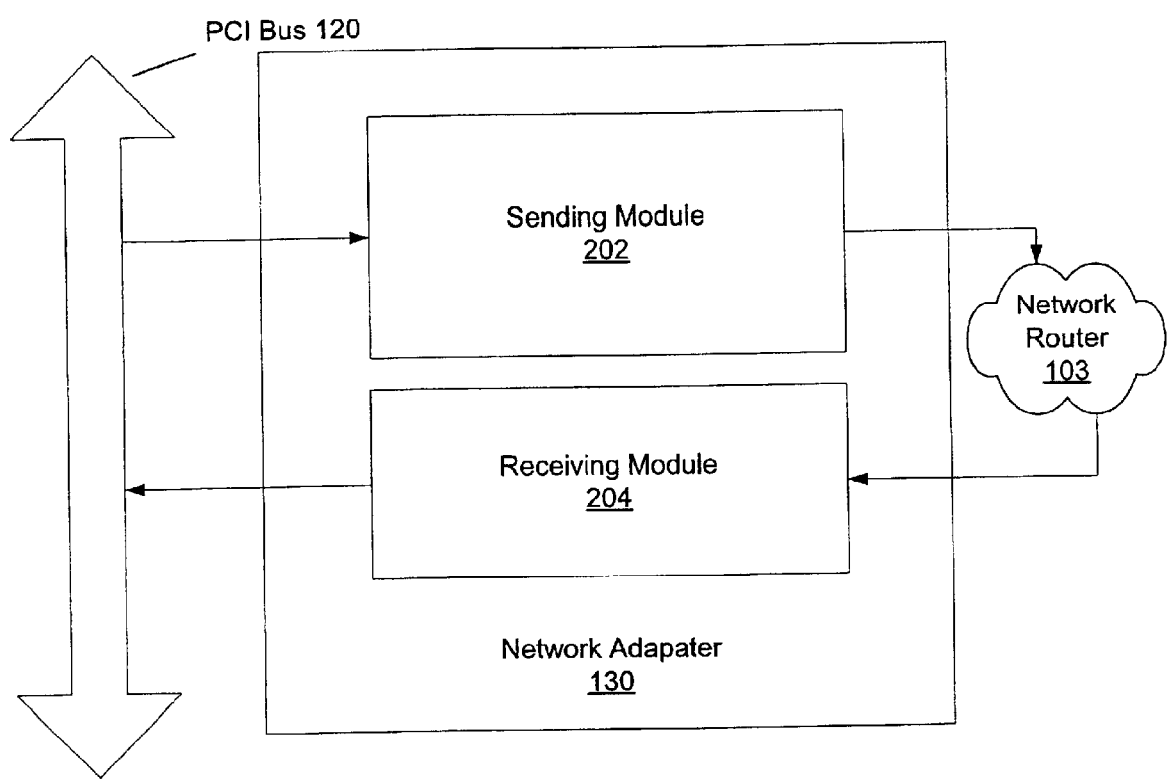
FIG. 2a is a block diagram of a network adapter in accordance with an embodiment of the present invention.

FIG. 2a illustrates a more detailed block diagram of network adapter 130. Network adapter 130 comprises a sending module 202 and a receiving module 204. Since network adapters 130 are preferably capable of both sending and receiving data, in a preferred embodiment they therefore comprise both the sending and receiving modules. In other embodiments, network adapters 130 may be configured to only send or only receive.

Figure 2B:
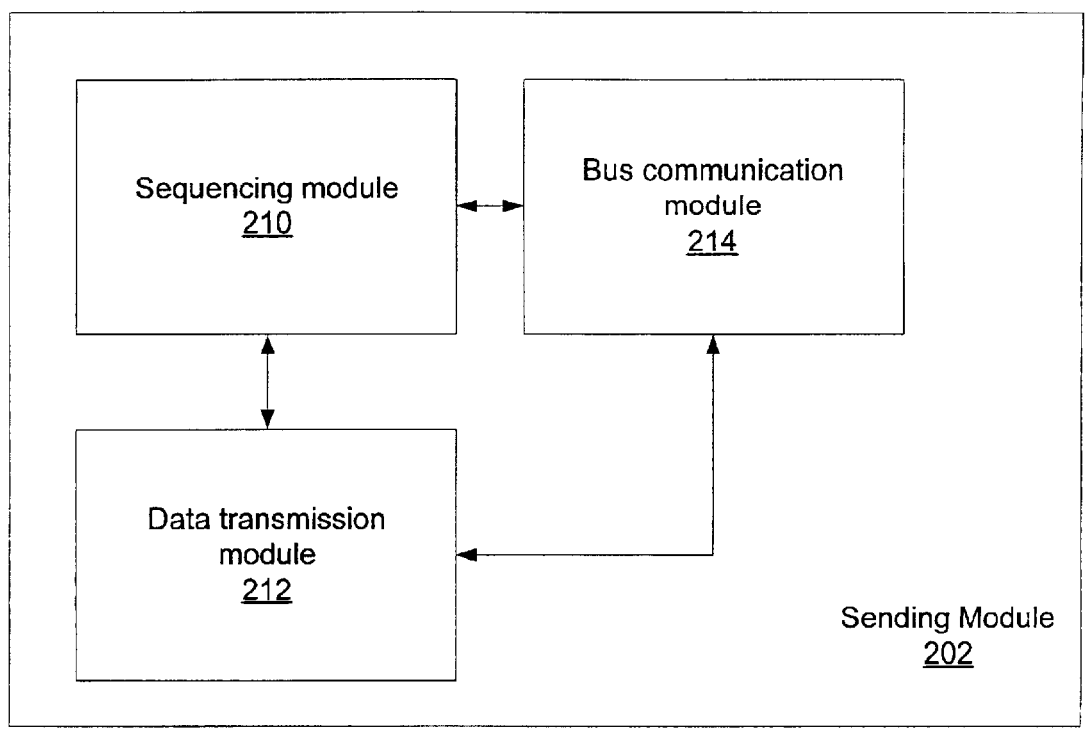
FIG. 2b is a block diagram of a sending module in accordance with an embodiment of the present invention.

FIG. 2b illustrates a more detailed block diagram of sending module 202. Sending module 202 additionally comprises a sequencing module 210, a data transmission module 212, and a bus communication module 214. The functionality of these modules is further described below with respect to FIG. 4.

Figure 2C:
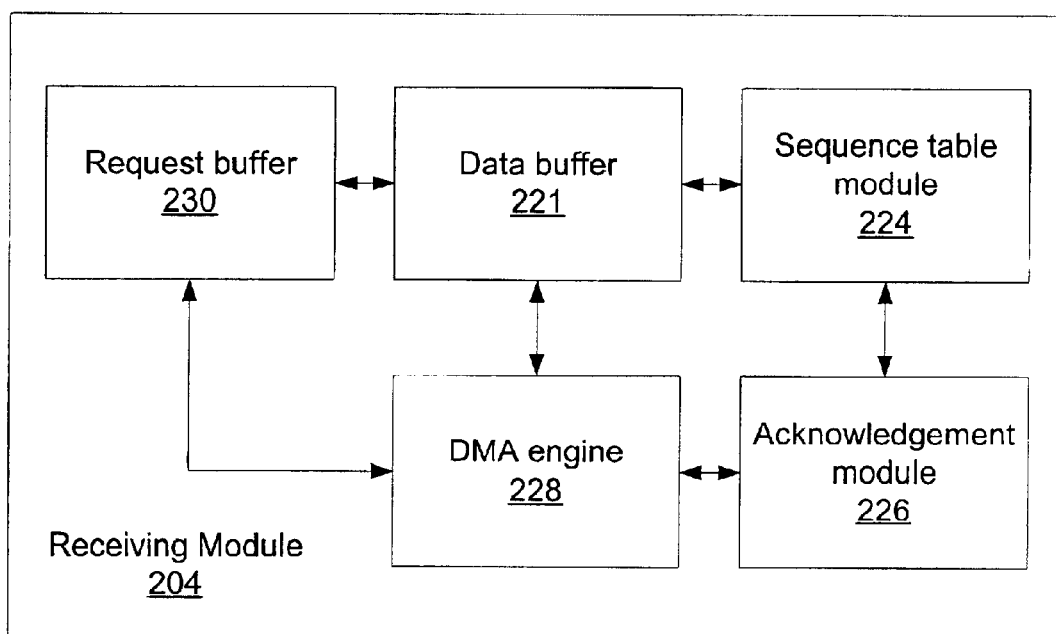
FIG. 2c is a block diagram of a receiving module in accordance with an embodiment of the present invention.

FIG. 2c illustrates a more detailed block diagram of receiving module 204. Receiving module 204 additionally comprises a data buffer 221, a request buffer 230, a sequence table module 224, acknowledgement module 226, and direct memory access (DMA) engine 228. Sequence table module 224 additionally comprises a sequence table, which in a preferred embodiment stores sequence information about the data packet, as described further below, and a node ID that identifies the sender of the data packet. The functionality of the illustrated modules is further described below with respect to FIG. 5.

Figure 3:
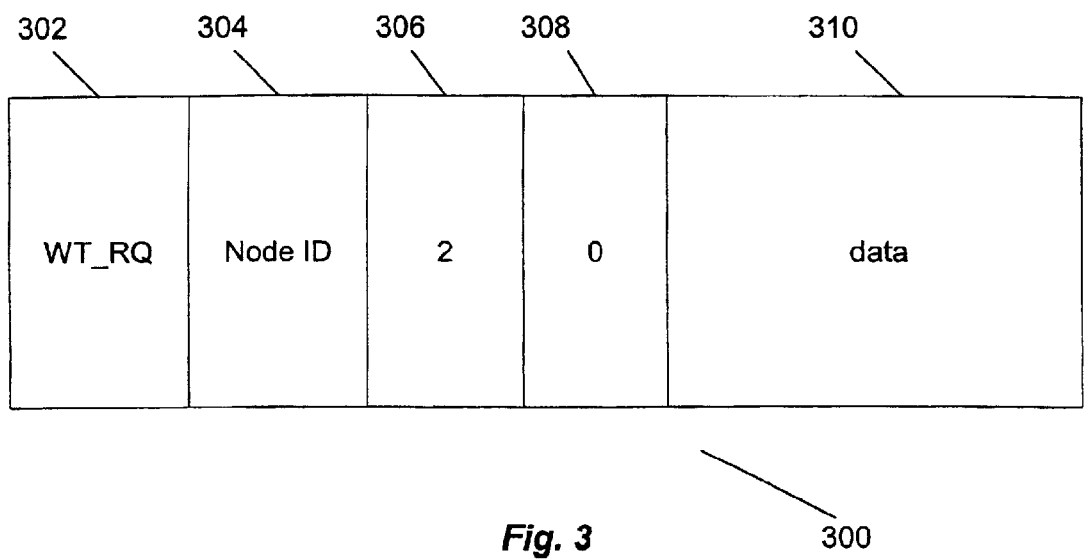
FIG. 3 is a block diagram of a data packet in accordance with an embodiment of the present invention.

Referring now to FIG. 3, there is shown an illustration of a data packet 300. In a preferred embodiment, a data packet 300 comprises a packet type 302, a node ID 304, a sequence number 306, an expected sequence number 308, and data 310. Packet type 302 identifies the type of data contained in the packet. In a preferred embodiment, the packet 300 is a write request packet, identified by the reference WT_RQ. In other embodiments, other suitable identifiers are used. Node ID 304 indicates the particular bus that is sending the data packet. This relieves the sequence table module from having to keep separate track of each node, as described below. Sequence number 306 is an identifier for the data packet, used to order the packets by the receiving module 204, as described further below. Expected sequence number 308 is an identifier for the data packet sent previous to the current data packet 300. The expected sequence number 308 is also used by the receiving module 204 to verify and order the received packets, as described below. Data 310 is the actual data that the sending module 202 wishes to transmit to the receiving module 204.

Figure 4:
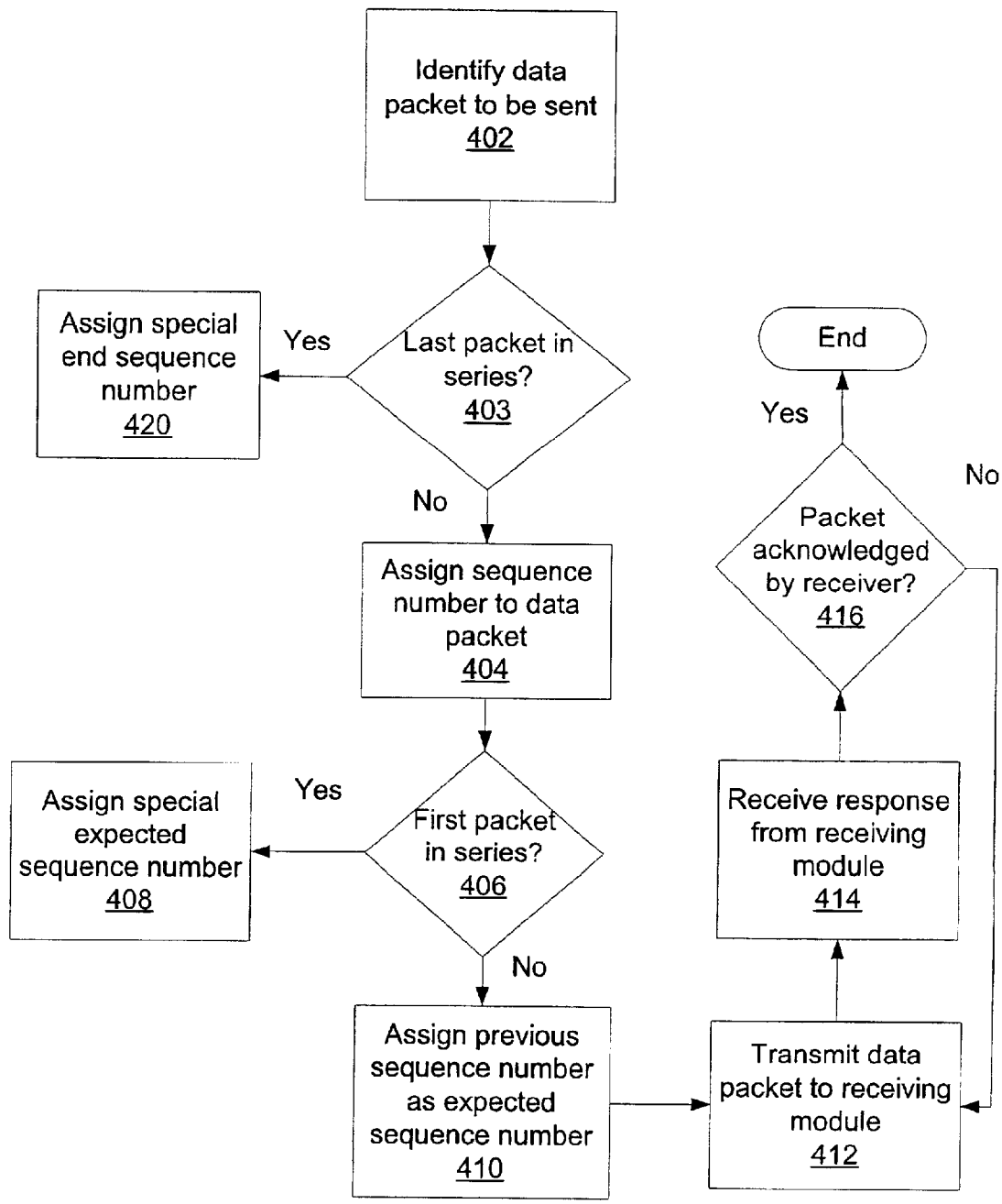
FIG. 4 is a flow chart illustrating the steps of sending data according to an embodiment of the present invention.

Referring now to FIG. 4, there is shown a flowchart of the operation of the sending module 202 in accordance with an embodiment of the present invention. A first device 110A initiates the sending of data to another device 110F across a network router 103 by putting the data on the PCI bus 120A, where it is then seen by sending module 202. In a preferred embodiment, the data is routed first to the bus communication module 214 (FIG. 2b) of sending module 202, which as mentioned is a component of network adapter 130.

Data is broken down by sequencing module 210 into a sequence of data packets, and the packets are queued for transmission over the network 103. System 100 identifies 402 a data packet 300 to be sent over the network, and assigns 404 a sequence number 306 to the data packet according to a sequence numbering algorithm in use by system 100. In a preferred embodiment, sequence numbers 306 represent the order in which data packets are transmitted. In other embodiments, sequence numbers are generated randomly or according to other constraints. System 100 also assigns expected sequence number 308, which in a preferred embodiment corresponds to the sequence number of the data packet immediately previous in sequence to the current data packet. For example, if data packets are numbered 0, 1, 2, 3, and the current packet is assigned sequence number 2, then it will also be assigned expected sequence number 1. Thus, those of skill in the art will recognize that the actual value of the sequence numbers is not significant, so long as system 100 assigns an expected sequence number that corresponds to the prior data packet in the sequence. If data packet 300 is 406 the first packet in the data series, then in a preferred embodiment, sending module 202 assigns 408 a special expected sequence 308 number such as "top", indicating that the packet is not preceded by an earlier data packet in the series. Otherwise, sending module 202 assigns 410 the previous sequence number to be the expected sequence number 308. Having assigned a sequence number and expected sequence number to the data packet 300, sending module 202 then transmits 412 the data packet to the receiving module 204 and receives 414 a status message back from the receiving module. If the status message is a resend request 416, sending module 202 returns to step 412, re-sending the data packet 300 to receiving module 204 until it is successfully received.

Note that for purposes of clarity, FIG. 4 traces the steps of sending a single data packet from sending module 202 to receiving module 204. In a preferred embodiment, sending module 202 sends many data packets 300 in quick succession, not waiting for a status message to be received 414 before sending 412 another data packet.

Figure 5:
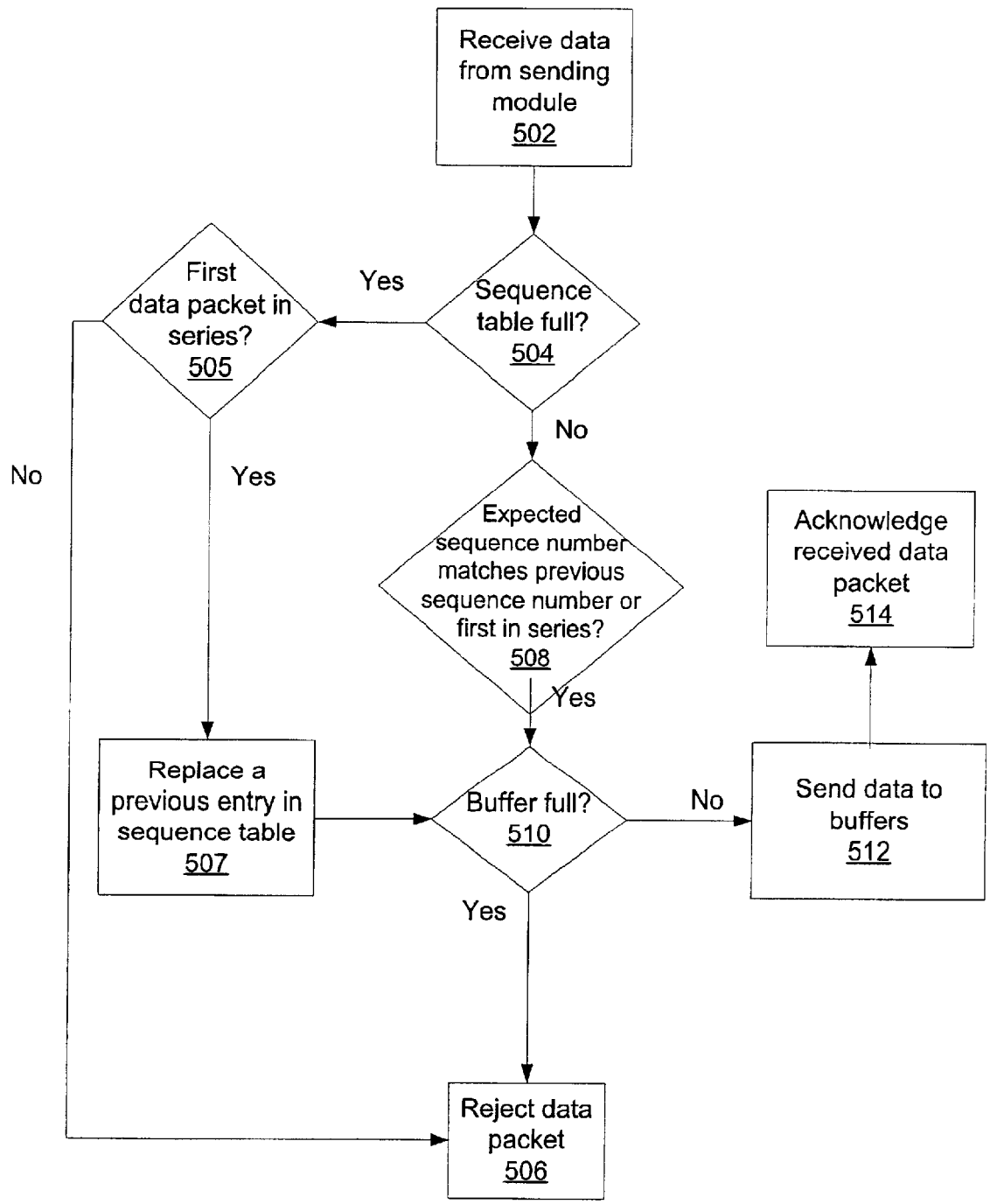
FIG. 5 is a flow chart illustrating the steps of receiving data according to an embodiment of the present invention.

Referring now to FIG. 5, there is shown a flowchart of the operation of receiving module 204 in accordance with an embodiment of the present invention. When receiving module 204 receives 502 an incoming data packet, it is handled in a preferred embodiment only if the sequence table is not full 504, unless it is 505 the first data packet in the series. If the sequence table is not available and the data is the first in a series, then the data packet 300 will replace 507 a previous entry in the sequence table. If the data packet is not first in a series and the sequence table is full, the data packet 300 is rejected 506, and a retry request message is sent to sending module 204.

Note that the size of the sequence table of sequence table module 224 vanes from one embodiment to another, depending on the size of the data 310 and the size of the data buffer 221. In one preferred embodiment, for example, data size is 64 bytes, and 512 bytes are available for the data buffer, resulting in a sequence table that stores up to 8 entries. Thus, if more than 8 nodes are sending data to be written, the sequence table may overflow. In order to determine whether there is room to store the data in the sequence table, sequence table module 224 looks for an entry in the table where the valid bit is not set. If the valid bit is not set, then any data in the entry can be safely overwritten. If the sequence table is full 504, then as described above, the data packet 300 either replaces an expired entry in the table if it is the first in a series, or else it is rejected 506 and a retry request message is sent to sending module 204. If the sequence table is not full, then the data packet is examined by sequence table module 224 to see if the expected sequence number 308 of the received data packet 300 indicates that the packet is the first in a series, or alternatively if the expected sequence number 308 matches 510 the sequence number 306 of a previously received data packet already in the sequence table and having a node ID corresponding to the node ID 304 of the received data packet. If no match can be found in the sequence table, the data packet 300 is rejected 506 and a retry request message is sent to sending module 204. If a match is found, then the buffer is checked 510 to see if there is room to store the data. If not, then the data packet is rejected 506 and a retry request is sent to the sending module 204. Otherwise, sequence information from the data packet 300 is stored 512 in the sequence table. The sequence table stores the sequence number 306 of the data packet 300, along with a node ID 304 that identifies the sending module 202 associated with the data packet 300. The sequence table additionally has a valid bit for each entry in the table. After storing the sequence information related to the data packet, the valid bit is set, indicating that the newly stored sequence data is valid.

Once sequence module 224 stores 512 the sequence data in the sequence table, the data 310 is sent to the buffer 221. In a preferred embodiment, data is sent to data buffer 221, and header information is sent to the request buffer 230. In other embodiments, data and header information may be stored together, or separated differently. Lastly, an acknowledgement is sent 516 to the sending module indicating that the data has been accepted. In other embodiments, an additional check is done to determine whether the data packet is the last in a series, and if so the valid bits of the sequence table are unset.

As noted, for a sequence table of size n, receiving requests from more than n nodes, it is possible that more than n data packets 300 will arrive at receiving module 204 at essentially the same time, from more than n sending modules 202. In such a case, the sequence table will immediately fill up. Should this occur, in a preferred embodiment sequence table module 224 accepts the first n data packets 300, and rejects the additional packets. The additional packets then are re-sent by sending module 202 in a manner similar to other non-received packets in response to retry requests.

Those of skill in the art will appreciate that since each bus 120 connected to network router 103 has a unique node-ID number, the size of the sequence table in receiving module 204 can be substantially reduced from the size required for a table that does not store node-ID numbers. By using node-IDs, separate sequence sub-tables do not need to be stored for each node. Rather, each entry in the table is associated with its originating node-ID regardless of where it is stored in the table.

In addition, because each data packet contains an expected sequence number 308 as well as its own sequence number 306, receiving module 204 can determine immediately whether a data packet has been received out of sequence by merely comparing its expected sequence number 308 with the sequence number of the last data packet received.

As will be understood by those familiar with the art, the invention may be embodied in other specific forms without departing from the spirit or essential characteristics thereof. For example, a bus 120 may have more or fewer devices 110 than are depicted in FIG. 1, sequence numbers may be assigned in many different ways to the various data packets, etc. Likewise, the particular capitalization or naming of the modules, protocols, features, attributes, data structures, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

We claim:

1. A method for sending data from a source across a network, comprising: associating sequence information with first data, the sequence information further comprising a sequence number and an expected sequence number, wherein the expected sequence number corresponds to a sequence number of data sent immediately prior to the first data; sending the first data and associated sequence information to a remote location; receiving the first data and associated sequence information at the remote location; and accepting the first data if its associated expected sequence number matches a sequence number associated with second data already accepted by the remote location, the second data sent by the source immediately prior to the sending of the first data.

2. The method of claim 1, further comprising: rejecting the received first data is its expected sequence number does not match the sequence number associated with the second data.

3. The method of claim 1, further comprising:
responsive to a determination that the received data should be accepted:
   accepting the data; and
   sending an acknowledgement indicating that the data has been accepted.

4. The method of claim 1, further comprising:
responsive to a determination that the received data should not be accepted:
   sending a retry request indicating that the data has not been accepted.

5. A method for transmitting data from a source across a network, comprising: associating a sequence number with first data; associating an expected sequence number with the first data, the expected sequence number related to a sequence number of a second data, the second data transmitted most recently across the network by the source; transmitting the first data, associated sequence number and expected sequence number across the network; receiving a responsive indicating whether the first data was successfully received by a remote receiver, wherein the first data was successfully received if the expected sequence number matches the sequence number of a data packet last received from the source; and responsive to an indication that the first data was not successfully received, resending the first data.

6. A method for receiving data sent across a network from a source, comprising: receiving a first data packet from the source, the first data packet including first data, a first sequence number; and a first expected sequence number, receiving a second data packet from he source, the second data packet including second data, a second sequence number, and a second expected sequence number, the second expected sequence number corresponding to a sequence number of a data packet sent by the source Immediately prior to the second data packet; determining whether the second expected sequence number corresponds to the first sequence number; responsive to a determination that the second expected sequence number corresponds to the first sequence number: storing the data of the first second data packet.

7. The method of claim 6, further comprising sending an acknowledgement indicating that the second data packet has been stored.

8. The method of claim 6, further comprising: responsive to a determination that the second expected sequence number does not correspond to the first sequence number: sending a retry request indicating that the second data packet was not accepted.

9. A method for writing first data received from a source over a network to a device on a bus, the method comprising: determining sequence information associated with the first data, further comprising: determining a sequence number associated with the first data; determining an expected sequence number associated with the first data, wherein the expected sequence number corresponds to a sequence number of data transmitted by the source to the device immediately prior to the transmission of the first data; determining whether the expected sequence number corresponds to a sequence number of second data last received from the source prior to receiving the first data; responsive to the expected sequence number corresponding to the sequence number of the second data: writing the first data to the bus; sending an acknowledgement message; and responsive to the expected sequence number not corresponding to the sequence number of the second data: sending a retry request message.

10. A system for transferring a data packet across network, the data packet comprising data, a sequence number and an expected sequence number, the system comprising: a sending module, for sending the data packet across the network and further comprising: a bus communication module, for receiving the data from a bus; a sequencing module, for assigning the sequence number and the expected sequence number to the data packet, wherein the expected sequence number corresponds to a sequence number of data most recently transmitted by the sending module to a same destination; a data transmission module, for transferring the data packet to a receiving module across the network; the receiving module, coupled to the network, for receiving the data packet, and further comprising: a sequence table module, for determining whether the data packet has been received in a correct order, wherein the data packet is received in the correct order if the expected sequence number matches the sequence number of a data packet last received from a same source, and wherein a retry request is sent if the data packet is not in the correct order; a data buffer for storing the data; and an acknowledgement module, for sending an acknowledgement to the sending module when the data packet is received in the correct order.

11. The system of claim 10, wherein the receiving module further comprises:

a request buffer for storing header information associated with the data packet; and a DMA engine for writing the data to a bus.

* * * * *

UNITED STATES PATENT AND TRADEMARK OFFICE
CERTIFICATE OF CORRECTION

PATENT NO. : 6,877,039 B2
DATED : April 5, 2005
INVENTOR(S) : Jeffrey D. Larson et al.

It is certified that error appears in the above-identified patent and that said Letters Patent is hereby corrected as shown below:

Column 6,
Line 49, "is" should be -- if --.

Column 7,
Line 15, "he" should be -- the --.
Line 24, "first" should be deleted.

Column 8,
Line 11, please insert -- a -- after "across".

Signed and Sealed this

Sixteenth Day of August, 2005

JON W. DUDAS
*Director of the United States Patent and Trademark Office*